2,776,286

PRODUCTION OF MELAMINE

Alban J. Lobdell, Wakefield, Mass., assignor to Monsanto Chemical Company, St. Louis, Mo., a corporation of Delaware No Drawing. Application September 26, 1955, Serial No. 536,750

12 Claims. (Cl. 260—249.7)

The present invention relates to the production of melamine, and more particularly to a continuous process of producing melamine.

It has been proposed heretofore to prepare melamine from urea. For example, British Patent No. 639,962 describes a process wherein molten urea at a temperature of 275° C. and under a pressure of 400 atmospheres is passed through a reactor tube, which is at a temperature of 450° C., for a contact time of about 0.3 to 3.5 minutes, after which the reaction mixture is quenched in an aqueous medium under pressure, passed through a heated let-down valve, filtered under pressure to remove insolubles, flashed in a flash evaporator and cooled to crystallize the melamine formed in the process. The British patent points out that narrow reactor tubes are used, and indicates that the formation of insolubles from urea in such tubes causes almost instantaneous plugging of the tubes unless the content of insoluble is kept very low, that is, below a few tenths of one percent. In such a process the urea is first converted to various intermediate products, including the insolubles, on its passage through the reactor tubes and the intermediate products finally form melamine. Thus, the urea entering one end of the reactor tube is never in contact with the melamine formed at the other end of the tube. The above process is very difficult to operate because plugging of the reactor tube occurs almost immediately unless the operating conditions of temperature, pressure and retention time in the tube are properly controlled within narrow limits. Such operating conditions are extremely difficult to achieve or maintain on a commercial scale. Moreover, corrosion of the reactor tube is a major problem when stainless steel reactor tubes are employed.

It is one object of this invention to provide an improved process of continuously producing melamine from urea or other melamine-forming substances in a pressure-resistant vessel with a minimum of plugging and corrosion difficulties.

It is a further object of this invention to provide an improved process of continuously producing melamine from urea in reactor tubes or similar types of apparatus while substantially preventing corrosion of the walls of such reactor tubes or plugging of the reactor tubes.

Still further objects and advantages of this invention will appear in the following description and the appended claims.

These and other objects of this invention are attained, in general, by continuously admixing molten urea and an excess of molten melamine, which is at a temperature sufficiently high to convert the urea to melamine and to remain in the molten state, in a non-precious metal, pressure-resistant vessel to form a suspension of urea in molten melamine, in which suspension the urea and intermediate products derived therefrom are out of contact with the walls of such vessel, without supplying any heat to the vessel other than the heat supplied by the molten melamine, the conversion of urea to melamine being carried out at superatmospheric pressures sufficiently high to prevent appreciable vaporization and deamination of the melamine. In the vessel the urea suspended in the melamine is converted to melamine and gaseous by-products, and thereafter, but without any specific sequence, the process is completed by removing an amount of gaseous by-products sufficient to maintain the pressure in the reaction vessel at the operating pressure, removing molten melamine from the vessel, isolating a portion of this melamine, heating at least a major portion of the molten melamine outside of the vessel to a temperature sufficiently high to convert urea to molten melamine according to the initial step of the process, and then recycling sufficient of the resulting melamine to the vessel to provide an excess of melamine for admixture with additional quantities of molten urea according to the initial step of the process. The conversion of urea to melamine is carried out in non-precious metal vessels or reactors which are corroded by urea or intermediate products derived from urea at melamine conversion temperatures, but are not corroded by molten melamine. Examples of such metals are the various stainless steels.

In carrying out the process of this invention, it is preferred to employ a small amount of melamine catalyst, that is, a substance which will increase the rate of conversion of a melamine precursor such as urea to melamine. As examples of melamine catalysts may be mentioned strong mineral acids such as phosphoric acid, including meta- and pyrophosphoric acid, sulfuric acid and hydrochloric acid, or the inorganic or organic salts of such acids, for example, ammonium or guanidine salts, or anhydrides of such acids as, for example, phosphoric anhydride. It is preferred to use phosphoric anhydride, or the ammonium salts of strong mineral acids, more preferably an ammonium salt of phosphoric acid such as diammonium phosphate. The amount of catalyst may be varied to some extent, but, in general, it is desirable to use from about 0.001 to 5% by weight of the catalyst based on the weight of molten melamine and molten urea charged to the reaction vessel. However, it is preferred to use from about 0.001 to 2% by weight of the catalyst, based on the weight of the melamine and urea charged to the reaction vessel.

The mechanism of the conversion of urea to melamine under the above conditions is not completely understood. However, data obtained by heating urea under pressure from its melting point to a temperature above about 350° C. indicates that the urea is first converted to various solid, water-insoluble intermediate products which may be products such as cyanuric acid, ammeline and ammelide, together with ammonia and carbon dioxide, and that these intermediate products are finally amidated or aminated to melamine by the ammonia formed from the urea. It is believed that these intermediate products cause plugging or corrosion of stainless steel reactor tubes when molten urea or molten urea and anhydrous ammonia are pumped through a heated reactor tube in the prior process hereinbefore referred to. It is also believed that by continuously admixing molten urea with an excess of molten melamine according to the processes of this invention, the intermediate products are formed in situ in the molten melamine and remain suspended in the melamine until they are amidated or aminated to melamine. Thus, there is no tendency for such intermediate products to contact the walls of the stainless steel reactor tube or autoclave, and, accordingly, there is little or no tendency to cause plugging or corrosion. It is to be understood, however, that the above mechanism of conversion of urea to melamine is given by way of explanation, and it is not intended to limit this invention to such theory. The fact remains that molten urea is continuously converted to melamine with a minimum of corrosion of plugging difficulties.

In carrying out the processes of this invention any pressure-resistant reactor tube or autoclave of the type described above which is capable of withstanding the pressures employed may be used to provide a reaction zone in which the urea and melamine are mixed and reacted. The process is suitably carried out, for example, by continuously pumping or injecting the molten melamine and molten urea into the top portion of a vertical or vertically-inclined stainless steel reactor tube or autoclave which is under a pressure sufficient to prevent appreciable vaporization and deamination of the melamine, and molten melamine containing dissolved by-product gases is withdrawn or removed continuously at or near the bottom of the reactor, some of the gaseous by-products escaping from the molten melamine into the free space above the molten melamine in the tube or autoclave. The molten melamine thus withdrawn is pumped through a pressure-resistant stainless steel pipeline and a relatively small portion of the melamine is continuously removed from the system while the balance of the molten melamine, which is substantially free of urea, is circulated through a pressure-resistant stainless steel heat exchanger, which is heated by means of hot combustion gases, molten salt baths such as molten sodium nitrate, lead bath, or the like, where the melamine is heated to a temperature sufficiently high to convert more urea to melamine as the melamine is recycled through the reactor tube or autoclave. The relatively small portion of melamine which is removed from the system or pipeline, as described above, is recovered in solid form in various conventional ways, for example, by vaporizing it and then passing it into the atmosphere through a hot let-down valve together with ammonia, or by quenching it with hot water under pressure, filtering the resulting solution to remove insolubles, releasing the pressure on the solution by passing it through a hot let-down valve and then crystallizing the melamine from the solution and drying the crystals. The amount of melamine which is continuously withdrawn or removed from the system and collected, as described immediately above, may be varied to some extent. Thus, it is possible to withdraw less melamine than is formed in the reaction zone or reactor tube for a short period of time and the balance of the molten melamine may be recycled through the reaction zone at the regular rate or at a slower rate for a short period of time. It is also possible to withdraw an amount of melamine from the system at substantially the same rate as melamine is formed from urea in the vessel or reaction zone, and this procedure is preferred from the standpoint of ease of operation and control. It is also possible to withdraw more melamine from the system than is formed from urea in the reaction zone, but this cannot be done continuously and must be done intermittently for short periods of time.

Since the only heat supplied to the system is the heat supplied to the molten melamine prior to its being mixed with molten urea, it is preferred to use insulated reactor tubes or autoclaves and insulated pipelines in order to prevent excessive heat losses.

It is possible to vary the above process in various ways. For example, the molten urea and molten melamine may be mixed together in a pressure-resistant stainless steel pipeline before entering the top portion of the reactor tube. Moreover, the molten melamine and molten urea may be continuously introduced by pumping or otherwise into the bottom portion of the reaction tube or autoclave and molten melamine may be withdrawn continuously from the top portion of the reactor tube or autoclave. The withdrawn melamine may be heated in various ways prior to recycling a major portion thereof to the reactor tube or autoclave. Further, the relatively small portion of melamine withdrawn from the system before recycling the bulk of the melamine may be withdrawn from the system before or after the melamine is heated outside of the reaction zone. These alternatives are given by way of illustration and are not intended to be exhaustive. Various other alternatives will be apparent to those skilled in the art to which this invention appertains.

During the mixing of the molten urea and molten melamine gaseous by-products which comprise ammonia and carbon dioxide are formed. Some of these gaseous by-products remain dissolved in the molten melamine. The gaseous by-products which are not dissolved may be separated from the molten melamine which is withdrawn from the reaction zone, that is, from the reactor tube or autoclave, either before or after the melamine is heated prior to being recycled back to the reaction zone for conversion of fresh molten urea. It is preferred, however, in order to avoid excessive pressure drops, to effect such separation before the molten melamine is heated prior to being recycled. A partial separation of the gaseous by-products which are dissolved in the molten melamine may be effected after the melamine is heated prior to recycling the melamine through the reactor tube. This separation of the gaseous by-products from the withdrawn melamine is suitably accomplished in the reactor tube or autoclave, as hereinbefore described, or the molten melamine and gaseous by-products may be pumped from the reactor tube or autoclave into a vertical pressure-resistant vessel wherein sufficient free space is maintained to allow the gaseous by-products to escape into the free space above the molten melamine. The pressure in the entire closed system, including the reaction zone, is controlled by releasing or not releasing the gaseous by-products, as required, to at least maintain the necessary operating pressure.

The apparatus used in the processes of this invention, and described above, may be constructed out of any material which is strong enough to withstand the operating pressure and which is, or may be made, resistant to corrosion by molten melamine. Thus, it is possible to use steel reactor tubes or autoclaves, pipelines, heat exchangers, etc. which are lined with material resistant to corrosion by molten melamine such as stainless steel and the like, or the entire apparatus may be constructed of stainless steel. One of the advantages of this invention is that the processes of this invention may be carried out in stainless steel equipment with a minimum of plugging and corrosion difficulties whereas stainless steel corrodes excessively when used in the prior process hereinbefore referred to.

In carrying out the process hereinbefore described, the amount of molten urea which is mixed with molten melamine may be varied considerably providing there is sufficient molten melamine present to maintain the mixture in a fluid state. In general, it is possible to mix the molten urea and molten melamine in such proportions that the resulting mixture contains up to about 25% by weight of molten urea or the intermediate products derived therefrom, and still maintain a fluid mass. When the molten urea and molten melamine are mixed rapidly and intimately, it is possible to obtain fluid mixtures which contain up to about 30% by weight of molten urea or the intermediate products derived therefrom. This is particularly possible when the melamine is at a temperature of about 600° C., since the conversion of urea to melamine is quite rapid at such temperatures. It is preferred, however, in order to minimize or eliminate plugging or corrosion difficulties, or both, to mix the molten urea and molten melamine in such proportions that the molten urea or its intermediate products do not exceed about 20% by weight, and more preferably do not exceed about 10% by weight, of the resulting mixture. The minimum amount of urea normally used is about 1% by weight of the mixture, but preferably should be at least 2% by weight of the mixture.

The rate of conversion of urea to melamine increases as the temperature of the molten melamine increases. It is possible to mix larger proportions of urea with molten melamine at higher temperatures because of the higher sensible heat of the molten melamine. Moreover, it is also possible to obtain a higher rate of production of melamine than is possible at lower temperatures. Accordingly, it is preferred to operate at higher temperatures. The maximum temperatures to which the molten melamine is heated prior to mixing it with the molten urea is just below its critical temperature. A suitable maximum operating temperature is about 600° C. Since the molten melamine which is mixed with the molten urea is the sole source of heat for converting the urea to melamine and since the conversion of urea to melamine is an endothermic reaction and there is some heat loss from the system, it is necessary to have the molten melamine at a temperature sufficiently high to convert the urea which is mixed therewith to melamine and to maintain the resulting mixture in the liquid state, that is, above the crystallizing or solidification temperature of molten melamine. This temperature will vary depending on the amounts of urea used in relation to molten melamine, and the size of the reactor tube or autoclave and the amount of heat loss from the system. In general, this temperature will be above 380° C., preferably 400° C. or higher, when comparatively small amounts of urea are mixed with the melamine, and above 450° C., preferably above 500° C., when larger amounts of urea are mixed with the melamine. For most purposes it is preferred to heat the melamine which is to be mixed with the urea to a temperature of 425 to 550° C.

The temperature of the molten urea which is mixed with the melamine may be varied considerably providing the urea is at a temperature sufficiently low and at a pressure sufficiently high to prevent appreciable conversion thereof to intermediate products or melamine prior to admixture with the molten melamine. Thus, the urea may be just above its melting temperature, that is, above 132° C., or it may be heated to higher temperatures, provided it is under sufficient pressure to prevent appreciable conversion thereof to other products. It is preferred, however, to maintain the urea at temperatures below about 275° C., and at such temperature at a pressure of at least 900 pounds per square inch (gauge), in order to avoid possible conversion of urea to its intermediate products prior to mixing with the molten melamine otherwise plugging or corrosion may take place in the urea feed pipe. However, the temperatures of the molten urea may be above 275° C. if the urea is supplied or pumped at a rate sufficiently rapid to prevent the formation of corrosive and/or insoluble intermediate products in the urea feed line or pipe. A preferred operating range for the molten urea just prior to mixing with melamine is about 140 to 250° C. at a pressure of 1000 to 6000 pounds per square inch (gauge).

Molten melamine is continuously removed from the reaction vessel at such a rate that it is substantially free of unreacted urea or the intermediate products derived from urea. This rate and point of withdrawal or removal of molten melamine from the reaction vessel will depend on the size of the reaction vessel, the rate of feed of urea to melamine, the amount of urea to melamine, the point of mixing of the urea and melamine, and the temperature of the molten melamine which is mixed with the urea. These factors are readily adjustable and controllable by one skilled in the art to which this invention appertains. It is preferred to operate the processes described herein so that the amount of molten melamine which is continuously withdrawn or removed from the reaction vessel is substantially free of unconverted urea or intermediate products derived from urea and is substantially equal to the amount of melamine supplied to the reaction vessel plus the amount of melamine formed from the urea in the reaction vessel. The rate of withdrawal of molten melamine from the reaction vessel is also preferably such that it equals the rate at which melamine is supplied to the reaction vessel plus the rate at which melamine is formed in the reaction vessel. After the molten melamine has been removed from the reaction vessel, it is preferred to continuously separate or remove therefrom a relatively small portion of the melamine which is substantially equal to the amount of melamine formed from urea in the reaction vessel and substantially at the same rate at which melamine is formed in the reaction vessel, as previously described herein. This relatively small amount of melamine is then recovered as hereinbefore described and represents the melamine produced from the urea. The yield of melamine from urea when operating in the above manner is between about 80 and 95% of the theoretical yield.

As is pointed out previously herein, the pressure in the reaction vessel in the closed system for recycling molten melamine is maintained sufficiently high to maintain the melamine in a substantially liquid state and to prevent appreciable vaporization and deamination of the melamine. This pressure, which is controlled by releasing the gaseous by-products as required, will vary depending primarily on the temperature of the molten melamine. When the temperature of the molten melamine is slightly above its crystallizing temperature the pressure may be as low as 1000 pounds per square inch absolute, although it is preferred to employ a minimum pressure of 1500 pounds per square inch absolute. As the temperature of the molten melamine is increased the pressure must be increased in order to avoid appreciable vaporization and deamination of the melamine. Thus, when the temperature of the molten melamine is between about 400 and 500° C., pressures between about 2000 and 4000 pounds per square inch absolute are desirable with the higher pressure corresponding to the higher temperature. At still higher temperatures pressures of 6000 pounds per square inch absolute or higher are desirable in order to prevent appreciable vaporization and deamination of the melamine. It is thus seen that at molten melamine temperatures between about 380 and 600° C., the process may be operated at pressures of about 1000 to 6000, preferably about 1500 to 6000, pounds per square inch absolute or higher, with the lower pressures corresponding to the lower temperatures. A preferred operating pressure range for the preferred molten melamine temperature of 425 to 550° C. is between 2000 and 6000 pounds per square inch absolute.

In starting up the processes of this invention, solid melamine and anhydrous ammonia are heated in the system until the melamine melts and the molten melamine is circulated through the closed system by a pump or otherwise until it is at the desired temperature. The anhydrous ammonia is charged with the melamine in an amount sufficient to obtain the desired operating pressure and to prevent deamination of the melamine. After the urea is continuously mixed with the molten melamine, as hereinbefore described, the requisite amount of ammonia and other gases evolved by the conversion of the urea is sufficient to maintain the operating pressure and to prevent appreciable deamination of the melamine. Hence, ammonia need not be supplied to the system after continuous operation is begun. However, anhydrous ammonia may be charged to the system continuously or intermittently, if desired, although no particular advantage other than suppression of deamination of small amounts of melamine is obtained.

A further understanding of the processes of this invention will be obtained from the following specific examples which are intended to illustrate the invention but not to limit the scope thereof, parts and percentages being by weight unless otherwise specified.

*Example I*

In carrying out the process described in this example, a vertical cylindrical insulated autoclave having an internal diameter of about 12 inches and an overall height of about ten feet was employed. The autoclave, which was of stainless steel, had a vent at the top thereof for releasing gaseous by-products and a molten melamine outlet pipe of stainless steel which was located in the bottom of the autoclave. This pipe, which was insulated, was connected to a stainless steel pump and the other end of the pump was connected to a stainless steel heat exchanger which was heated by hot combustion gases. The other end of the heat exchanger was connected by an insulated stainless steel pipe to the autoclave at a point about 6 feet above the bottom of the autoclave, thus providing a closed, high pressure system. Molten urea was introduced through an insulated stainless steel pipe into the molten melamine pipeline leaving the heat exchanger, that is, between the outlet of the heat exchanger and the autoclave.

Molten melamine was introduced at a temperature of 450° C. into the autoclave along with anhydrous ammonia until the level of the molten melamine in the autoclave was above the point at which melamine is normally supplied to the autoclave from the heat exchanger. During this time the melamine was circulated through the system and the autoclave and pipelines were temporarily heated electrically to maintain the melamine at a temperature of 450° C. Sufficient anhydrous ammonia was employed to maintain a pressure in the system of 3500 pounds per square inch absolute. Thereafter, molten urea at a temperature of 140° C. was continuously pumped into the molten melamine pipeline between the outlet of the heat exchanger and the autoclave and simultaneously the heat exchanger was heated with hot combustion gases to maintain the temperature of the molten melamine leaving the heat exchanger at 450° C. The molten melamine and molten urea were continuously mixed at such a rate that the resulting mixture contained about 6% urea at the instant in which mixing occurred. The urea thus introduced into the autoclave was substantially converted to melamine within a period of about 60 seconds, and carbon dioxide and ammonia were also formed. That portion of the ammonia and carbon dioxide which did not dissolve in the molten melamine bubbled up through molten melamine into the free space at the top of the autoclave. These gases were released through a vent in the top of the autoclave at a rate sufficient to maintain the pressure of 3500 pounds per square inch absolute. Molten melamine was continuously pumped from the bottom of the autoclave through the melamine outlet pipe at a rate sufficient to maintain a substantially constant liquid level in the autoclave. The temperature of this melamine was lower than the temperature of the melamine supplied to the autoclave from the heat exchanger due to the endothermic nature of the conversion of urea to melamine. A portion of this molten melamine was continuously removed from the system at a rate equal to the rate at which melamine was continuously formed from urea in the autoclave. The balance of the molten melamine was continuously pumped through the heat exchanger where it was heated to a temperature of 450° C. and thence into the autoclave as hereinbefore described. No heat was supplied to the melamine in the system except in the heat exchanger after continuous addition of urea was begun. Since the urea was suspended in the melamine out of contact with the walls of the autoclave, conversion of the urea to melamine occurred without appreciable corrosion of the apparatus.

The portion of the melamine which was continuously removed from the system, that is, was not circulated back to the autoclave, was recovered in solid form using the procedure described in U. S. Patent No. 2,549,492.

*Example II*

Molten urea was converted to molten melamine using the same procedure described in Example I except that 0.05% of diammonium hydrogen phosphate, based on the weight of melamine and urea charged to the autoclave, was used as a catalyst. The rate of conversion of the urea to melamine was faster than in Example I. This indicates that the urea may be fed at a greater rate than in Example I, with a consequent increase in the rate of melamine production when a catalyst is used.

This application is a continuation-in-part of my copending application Serial No. 264,349, filed December 31, 1951.

What is claimed is:

1. A continuous process of producing melamine which comprises continuously mixing molten urea and molten melamine which is at a temperature of 380 to 600° C. in a non-precious metal pressure-resistant vessel at a superatmospheric pressure of at least 1000 pounds per square inch, which vessel is corroded by urea and intermediate products derived from urea but is not appreciably corroded by molten melamine at said temperatures, while preventing appreciable vaporization and deamination of said molten melamine, to form a fluid suspension containing less than 30% by weight of urea and intermediate products derived from urea, in which suspension said urea and intermediate products are out of contact with the walls of said vessel, said molten melamine being the sole source of heat for converting said urea to melamine, maintaining said urea and intermediate products suspended in said molten melamine and out of contact with the walls of said vessel until they are converted to melamine and gaseous by-products, removing molten melamine from said vessel while retaining in said vessel a fluid suspension containing less than 30% by weight of said urea and intermediate products, isolating a portion of the molten melamine thus removed, heating at least a major portion of the molten melamine removed from said vessel to a temperature of from 380 to 600° C. while preventing appreciable deamination of said molten melamine, recycling the molten melamine thus heated to said vessel for admixture with molten urea according to the first step of the process defined herein and maintaining the molten melamine in the liquid state at a superatmospheric pressure of at least 1000 pounds per square inch while preventing appreciable deamination thereof.

2. A process according to claim 1, but further characterized in that the portion of molten melamine removed from the vessel and then isolated is substantially equal to the amount of molten melamine formed in said vessel.

3. A continuous process of producing melamine which comprises continuously mixing molten urea and molten melamine which is at a temperature of 380 to 600° C. in a pressure-resistant stainless steel vessel at a superatmospheric pressure of at least 1500 pounds per square inch to form a fluid suspension containing less than about 20% by weight of urea and intermediate products derived from urea in which suspension said urea and intermediate products are out of contact with the walls of said vessel, said molten melamine being the sole source of heat for converting said urea and intermediate products to melamine, maintaining said urea and intermediate products suspended in the molten melamine and out of contact with the walls of said vessel until they are converted to melamine and gaseous by-products, continuously removing molten melamine from said vessel while retaining in said vessel a fluid suspension containing less than 20% by weight of urea and said intermediate products, continuously heating a major portion of the molten melamine thus removed to at least the temperature of the molten melamine initially supplied to said vessel, continuously recycling the heated molten melamine to said vessel in accordance with the first step of this process, continuously removing the balance of the molten melamine which is not recycled to said vessel from the system and isolating this melamine, and controlling the pressure in said vessel by releasing gaseous products from said vessel.

4. A process according to claim 3, but further characterized in that the conversion of urea to melamine is carried out in the presence of a small amount of phosphoric anhydride.

5. A process according to claim 3, but further characterized in that the conversion of urea to melamine is carried out in the presence of a small amount of an ammonium salt of a strong mineral acid.

6. A process according to claim 5, but further characterized in that the ammonium salt is an ammonium salt of phosphoric acid.

7. A continuous process of producing melamine which comprises continuously mixing molten urea and molten melamine in a pressure-resistant stainless steel vessel at a superatmospheric pressure of between about 1500 and 6000 pounds per square inch to form a fluid suspension containing less than 10% but at least 1% by weight of urea and intermediate products derived from urea in which suspension said urea and intermediate products are out of contact with the walls of said vessel, said melamine being at a temperature of 380 to 600° C. and being the sole source of heat for the conversion of urea to melamine, maintaining said urea and intermediate products suspended in said molten melamine and out of contact with the walls of said vessel until they are converted to melamine and gaseous by-products, continuously removing molten melamine from said vessel to maintain the mass in said vessel substantially constant, continuously withdrawing a portion of this molten melamine from the process in an amount substantially equal to the melamine formed in said vessel and isolating this melamine, continuously heating the remainder of the molten melamine outside of said vessel to a temperature of 380 to 600° C. while preventing appreciable deamination of the melamine, recycling this heated molten melamine to said vessel in admixture with additional molten urea according to the first step defined herein, and continuously controlling the pressure in said vessel between about 1500 and 6000 pounds per square inch, with the lower pressure corresponding to the lower temperature of the molten melamine, by releasing gaseous products from said vessel.

8. A process according to claim 7, but further characterized in that the conversion of urea to melamine is carried out in the presence of a small amount of phosphoric anhydride.

9. A process according to claim 7, but further characterized in that the conversion of urea to melamine is carried out in the presence of a small amount of an ammonium salt of a strong mineral acid.

10. A process according to claim 9, but further characterized in that the ammonium salt is diammonium hydrogen phosphate.

11. A continuous process of producing melamine which comprises continuously introducing a fluid suspension of molten urea in molten melamine which suspension contains less than 10% but at least 2% by weight of urea and intermediate products derived from urea into the top portion of a vertical pressure-resistant stainless steel vessel under a superatmospheric pressure between about 2000 and 6000 pounds per square inch absolute while maintaining said urea and intermediate products suspended in said molten melamine and out of contact with the walls of said vessel, said melamine being at a temperature between 425 and 550° C. and being the sole source of heat for the conversion of urea to melamine, maintaining said urea and intermediate products suspended in said molten melamine and out contact with the walls of said vessel until they are converted to melamine and gaseous by-products, continuously removing molten melamine which is substantially free of unconverted urea from the bottom of said vessel to maintain the mass in said vessel substantially constant, continuously withdrawing a portion of this melamine from the process in an amount substantially equal to the amount of melamine formed in said vessel, continually heating the remainder of the melamine removed from said vessel to a temperature between about 425 and 550° C. while preventing appreciable deamination of the melamine, recycling the heated molten melamine to the top portion of said vessel together with additional quantities of urea according to the first step defined herein, and continuously controlling the pressure in said vessel between about 2000 and 6000 pounds per square inch absolute, with the lower pressure corresponding to the lower temperature of the molten melamine, by releasing gaseous products from said vessel.

12. A continuous process of producing melamine which comprises continuously mixing molten urea and molten melamine which is at a temperature between about 400 and 600° C. in a pressure-resistant stainless steel vessel under superatmospheric pressure to form a fluid suspension containing not more than 10% by weight of urea and intermediate products derived from urea in which suspension said urea and intermediate products are out of contact with the walls of said vessel, said melamine being the sole source of heat for the conversion of urea to melamine, maintaining said urea and intermediate products suspended in said molten melamine and out of contact with the walls of said vessel until they are converted to melamine and gaseous by-products, continuously removing molten melamine from said vessel while maintaining the mass in said vessel substantially constant, continuously withdrawing from the molten melamine thus removed a portion of melamine substantially equal to the amount of melamine formed in said vessel and isolating the melamine thus withdrawn, continuously heating the remainder of the molten melamine outside of said vessel to a temperature of about 400 to 600° C. while preventing appreciable deamination of the melamine, recycling this heated molten melamine to said vessel in admixture with additional molten urea according to the first step defined herein, and continuously releasing gases from said vessel while maintaining the pressure in said vessel at about 1500 to 6000 pounds per square inch, with the lower pressure corresponding to the lower temperature of the molten melamine.

References Cited in the file of this patent

UNITED STATES PATENTS

| 2,566,224 | Mackay | Aug. 28, 1951 |
| 2,566,229 | Mackay | Aug. 28, 1951 |

FOREIGN PATENTS

| 583,504 | Great Britain | 1946 |